US012712217B2

(12) United States Patent
Ahn

(10) Patent No.: US 12,712,217 B2
(45) Date of Patent: Aug. 18, 2026

(54) BATTERY MODULE COMPRISING COOLING PLATE FILLED WITH PHASE CHANGE MATERIAL

(71) Applicant: HYUNDAI MOBIS CO., LTD., Seoul (KR)

(72) Inventor: Kihoon Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 597 days.

(21) Appl. No.: 18/203,286

(22) Filed: May 30, 2023

(65) Prior Publication Data

US 2024/0170761 A1 May 23, 2024

(30) Foreign Application Priority Data

Nov. 21, 2022 (KR) ........................ 10-2022-0156144

(51) Int. Cl.
*H01M 10/6555* (2014.01)
*H01M 10/613* (2014.01)
(Continued)

(52) U.S. Cl.
CPC ..... *H01M 10/6555* (2015.04); *H01M 10/613* (2015.04); *H01M 10/647* (2015.04); *H01M 10/6552* (2015.04); *H01M 10/6569* (2015.04)

(58) Field of Classification Search
CPC ........... H01M 10/6555; H01M 10/613; H01M 10/647; H01M 10/6569; H01M 10/482;
(Continued)

(56) References Cited

U.S. PATENT DOCUMENTS 8,623,538 B2 * 1/2014 Wang ...................... B60L 50/64
165/41
2005/0202310 A1 * 9/2005 Yahnker .................. B25F 5/008
429/62

(Continued)

FOREIGN PATENT DOCUMENTS

EP 3 913 729 A1 11/2021
JP 2006-253149 A 9/2006

(Continued)

OTHER PUBLICATIONS

Translation of JP 2022042772 (Year: 2025).*

(Continued)

*Primary Examiner* — Jennifer Dieterle
(74) *Attorney, Agent, or Firm* — Morgan, Lewis & Bockius LLP

(57) ABSTRACT

A battery module comprises a plurality of battery cells, a plurality of cooling plates each installed between adjacent battery cells among the plurality of battery cells to absorb heat from the plurality of battery cells, a heat transfer interface material coupled to one side of the plurality of battery cells to be in contact with the plurality of cooling plates, and receiving heat from the cooling plates a cooling channel coupled to one side of the heat transfer interface material to receive heat from the heat transfer interface material and transfer heat to the outside, wherein each cooling plate of the plurality of cooling plates is filled with the phase change material.

12 Claims, 6 Drawing Sheets

(51) Int. Cl.
*H01M 10/647* (2014.01)
*H01M 10/6552* (2014.01)
*H01M 10/6569* (2014.01)

(58) Field of Classification Search
CPC ............. H01M 50/507; H01M 10/653; H01M 10/6557; H01M 50/242; H01M 10/617; H01M 10/625; H01M 10/6556; H01M 10/659; H01M 50/209; H01M 50/211; Y02E 60/10
See application file for complete search history.

(56) References Cited

U.S. PATENT DOCUMENTS

2015/0140366 A1* 5/2015 Nicholls ............. H01M 10/633 429/50
2017/0222274 A1* 8/2017 Sohn ....................... B60L 58/15
2018/0094846 A1* 4/2018 Koelsch ................ F25D 29/003
2018/0351219 A1* 12/2018 Smith ................... H01M 50/30
2020/0313139 A1 10/2020 Christin et al.
2020/0358057 A1* 11/2020 Lindstrom ........ H01M 10/6551
2022/0238939 A1* 7/2022 Ozawa ................ H01M 10/651
2022/0336883 A1* 10/2022 Galvis ............... H01M 10/6554
2023/0147569 A1* 5/2023 Darbandi ............ H01M 10/658 429/120
2023/0198047 A1* 6/2023 Hwang ............... H01M 10/647 429/120
2024/0204291 A1* 6/2024 Sarkar ................. H01M 50/213
2026/0036380 A1* 2/2026 Gettle ..................... F24H 3/022

FOREIGN PATENT DOCUMENTS

JP 2022-042772 A 3/2022
JP 2022042772 * 3/2022

OTHER PUBLICATIONS

Clifford NPL article (Sep. 27, 2022) (Year: 2022).*
Office action issued on Apr. 24, 2024 for corresponding EP Patent Application No. 23204825.6.

* cited by examiner

[FIG. 1]
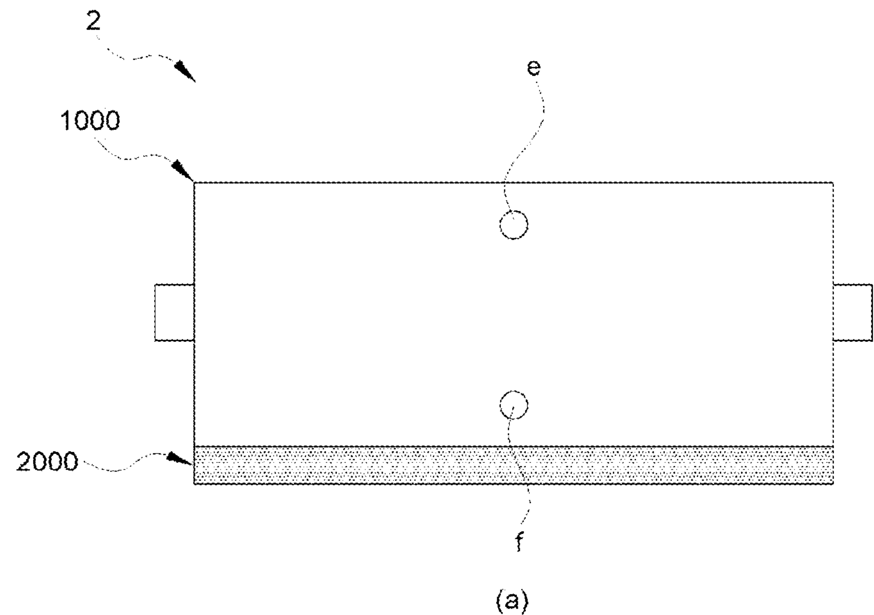
(a)
| CASE | EVALUATION CONDITION | RESULT | |
|---|---|---|---|
| | | e | f |
| 1 | FAST CHARGE | 45.1℃ | 33.3℃ |
(b)

[FIG. 2]
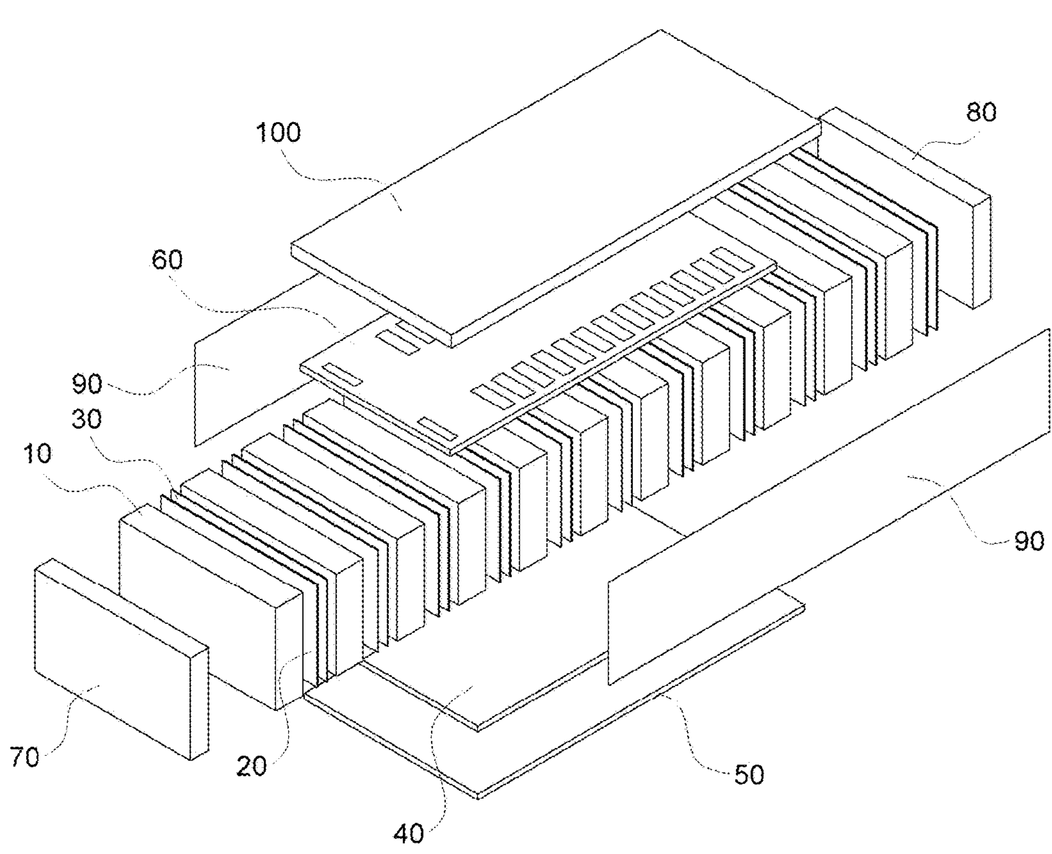

[FIG. 3]
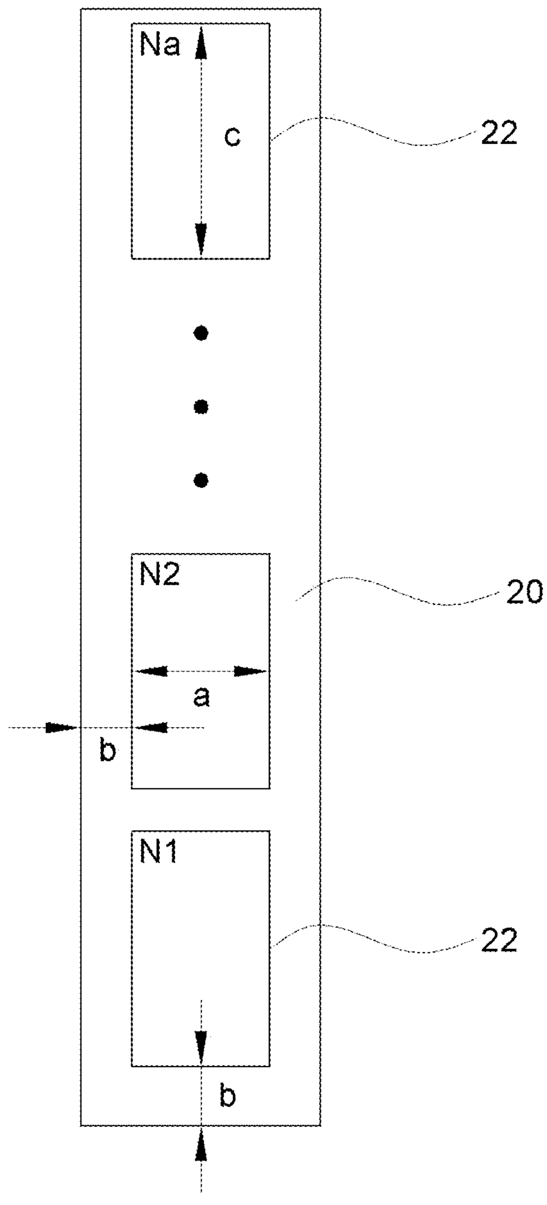

[FIG. 4]

| CHAMBER | PHASE CHANGE TEMPERATURE(℃) OF APPLIED PCM | | | |
|---|---|---|---|---|
| | n=2 | n=3 | n=4 | n=5 |
| N1 | 25~55 | 35~55 | 40~55 | 45~55 |
| N2 | 5~25 | 15~35 | 25~40 | 35~45 |
| N3 | - | 5~15 | 15~25 | 25~35 |
| N4 | - | - | 5~15 | 15~25 |
| N5 | - | - | - | 5~15 |

[FIG. 5]
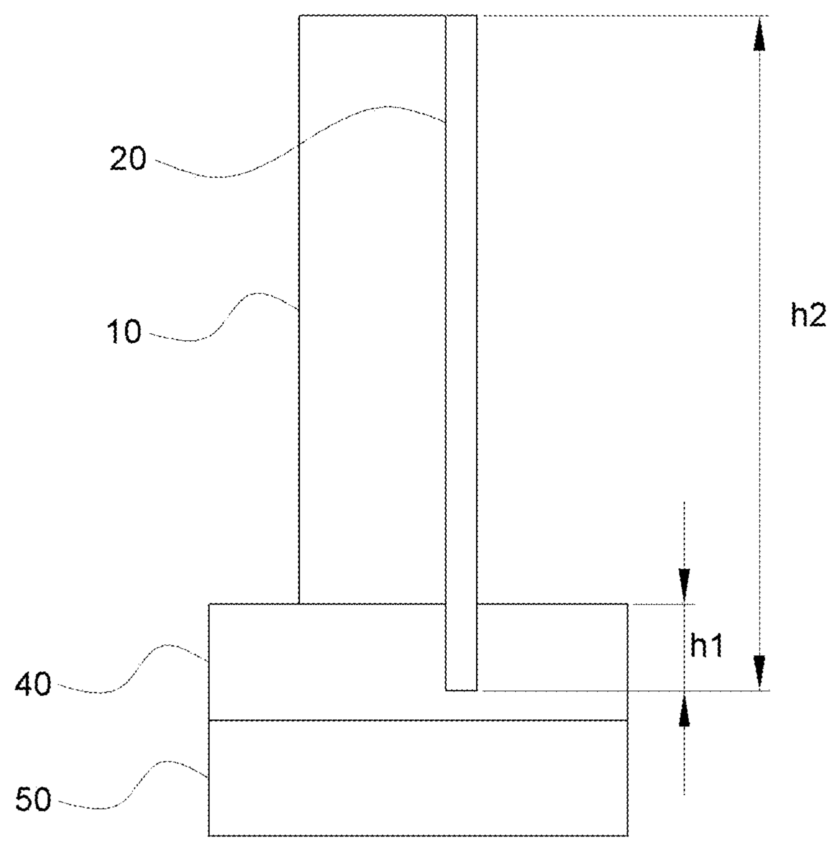

[FIG. 6]
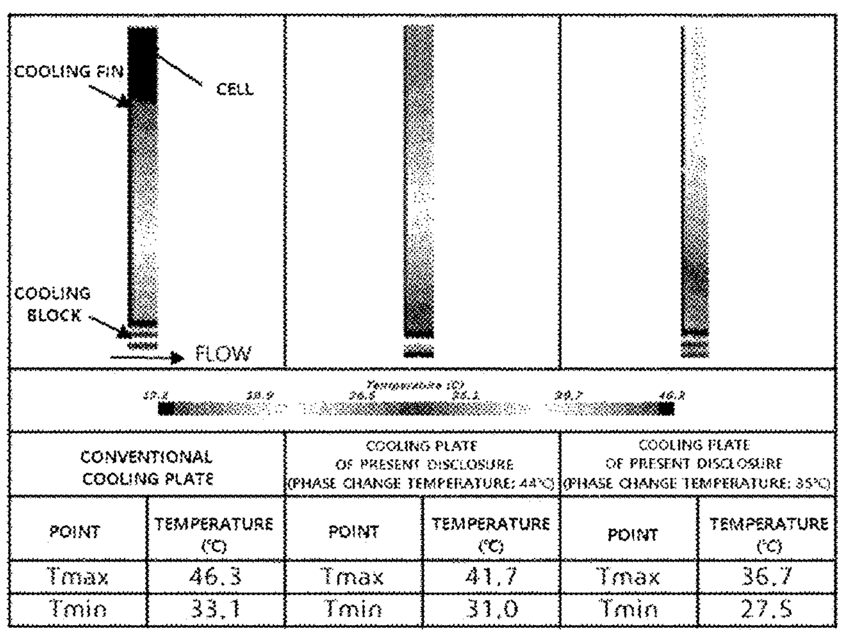
| CONVENTIONAL COOLING PLATE | | COOLING PLATE OF PRESENT DISCLOSURE (PHASE CHANGE TEMPERATURE: 44°C) | | COOLING PLATE OF PRESENT DISCLOSURE (PHASE CHANGE TEMPERATURE: 35°C) | |
|---|---|---|---|---|---|
| POINT | TEMPERATURE (°C) | POINT | TEMPERATURE (°C) | POINT | TEMPERATURE (°C) |
| Tmax | 46.3 | Tmax | 41.7 | Tmax | 36.7 |
| Tmin | 33.1 | Tmin | 31.0 | Tmin | 27.5 |

BATTERY MODULE COMPRISING COOLING PLATE FILLED WITH PHASE CHANGE MATERIAL

CROSS-REFERENCE TO RELATED APPLICATIONS

This application claims priority under 35 U.S.C. § 119 to Korean Patent Application No. 10-2022-0156144, filed on Nov. 21, 2022, in the Korean Intellectual Property Office, the disclosure of which is incorporated herein by reference in its entirety.

TECHNICAL FIELD

The following disclosure relates to a battery module comprising a cooling plate filled with a phase change material, and more particularly, to a battery module comprising a cooling plate filled with a phase change material, in which a plurality of battery cells included in the battery module are cooled by the plurality of cooling plates each filled with the phase change material.

BACKGROUND

A battery used in a machine requiring output greater than output required for a conventional electric vehicle may generate a large amount of heat, and thus need to be effectively cooled.

For example, air mobility may require two to three times greater output than the conventional electric vehicle. The air mobility requiring such greater output may generate a large amount of heat from its battery used as a power source, and the battery may thus need to be cooled more effectively.

FIGS. 1A and 1B are views respectively showing a conventional cooling structure of a battery cell and a table showing a temperature of the battery cell for each position.

As shown in FIG. 1, a conventional cooling structure 2 of a battery cell may cool a battery cell 1000 by bringing a cooling block 2000 into contact with one side of the battery cell 1000 (see FIG. 1A).

In the conventional cooling structure 2 of the battery cell, a portion of the battery cell 1000 that is adjacent to the cooling block 2000 may be cooled to have a lower temperature. However, a portion of the battery cell 1000 disposed away from the cooling block 2000 may be cooled to a higher temperature due to lower cooling efficiency (see FIG. 1 B).

Therefore, a temperature deviation of the battery cell for each position may be large when the battery cell is cooled using the conventional cooling structure 2 of the battery cell to thus cause a problem such as lower performance of the battery cell. Therefore, it is necessary to develop a battery module having a cooling structure which may cool the battery cell while minimizing the temperature deviation of the battery cell for each position.

In addition, a battery module using a conventional cooling method of a battery cell such as a liquid immersion cooling method may be heavier. However, it is important for a machine such as the air mobility to be lightweight. Accordingly, it is required to develop a battery module including a cooling structure which may effectively cool the battery cell while being lightweight.

SUMMARY

An embodiment of the present disclosure is directed to providing a battery module including a cooling structure which may effectively cool a battery cell while being lightweight.

Another embodiment of the present disclosure is directed to providing a battery module including a cooling structure which may cool a battery cell while minimizing temperature deviation of the battery cell for each position.

Technical tasks of the present disclosure are not limited to those mentioned above, and other tasks not mentioned here may be obviously understood by those skilled in the art from the following description.

In one general aspect, a battery module comprising a cooling plate filled with a phase change material includes: a plurality of battery cells; a plurality of cooling plates each installed between the adjacent battery cells among the plurality of battery cells to absorb heat from the plurality of battery cells; a heat transfer interface material coupled to one side of the plurality of battery cells to be in contact with the plurality of cooling plates, and receiving heat from the cooling plates; and a cooling channel coupled to one side of the heat transfer interface material to receive heat from the heat transfer interface material and transfer heat to the outside, wherein the cooling plate is filled with the phase change material.

At least one chamber may be disposed in the cooling plate, and the phase change material fills the chamber.

The plurality of chambers may be disposed in the cooling plate to be further away from the heat transfer interface material.

The phase change materials filled in the chambers may respectively have different phase change temperatures.

The phase change material filled in the chamber disposed at a first distance from the heat transfer interface material may have the phase change temperature of a first degree, the phase change material filled in the chamber disposed at a second distance from the heat transfer interface material may have the phase change temperature of a second degree, the first distance may be longer than the second distance, and the first degree may be lower than the second degree.

The cooling plate may be made of aluminum.

The number of the plurality of chambers may be 5 or less.

A shortest distance between the chamber and an outer circumferential surface of the cooling plate may be half of a width of the chamber.

The width of the chamber may be 2 mm or less.

A height of the chamber may be 5 mm or more.

The cooling plate may have a predetermined portion inserted into the heat transfer interface material, and a length of the predetermined portion may be 5% or more of a longitudinal length of the cooling plate to be further away from the heat transfer interface material.

The phase change material filling the cooling plate may be a paraffin-based material.

The phase change temperature of the phase change material filling the cooling plate may be 5 degrees or more and 55 degrees or less.

A pad having elasticity may be installed between the cooling plate and the battery cell adjacent to the cooling plate.

The battery module, in which each of the plurality of battery cells is a prismatic battery cell or a pouch-type battery cell, may further include: a board including a bus bar electrically connecting the plurality of battery cells to each other and a printed wiring circuit board for measuring the voltages and temperatures of the plurality of battery cells, and installed on top of the plurality of battery cells; a front plate coupled to the front of the plurality of battery cells; a rear plate coupled to the rear of the plurality of battery cells; a side plate coupled to the side of the plurality of battery cells; and an upper cover coupled to the top of the plurality of battery cells to cover the board.

The heat transfer interface material may have a thermal conductivity of 3 W/mk or more.

Details of other embodiments are included in the description and drawings of the present disclosure.

BRIEF DESCRIPTION OF THE DRAWINGS

FIGS. 1A and 1B are views respectively showing a conventional cooling structure of a battery cell and a temperature of the battery cell, included in the conventional cooling structure of the battery cell, for each position.

FIG. 2 is an exploded view showing a battery module comprising a cooling plate filled with a phase change material according to an embodiment of the present disclosure.

FIG. 3 is a cross-sectional view of the cooling plate.

FIG. 4 is a table showing an example of a cooling plate filled with a phase change material that has a different phase change temperature for each chamber.

FIG. 5 is a view showing the cooling plate whose predetermined portion is inserted into a heat transfer interface material.

FIG. 6 is a table showing a temperature of a battery cell for each position based on a conventional cooling plate and a cooling plate included in the battery module comprising a cooling plate filled with a phase change material.

DETAILED DESCRIPTION OF EMBODIMENTS

Hereinafter, embodiments are described in detail with reference to the accompanying drawings to be easily practiced by those skilled in the art to which the present disclosure pertains. However, the present disclosure may be implemented in various different forms and is not limited to the embodiments described herein. In addition, in the drawings, portions unrelated to the description are omitted to clearly describe the present disclosure, and similar portions are denoted by similar reference numerals throughout the specification.

In addition, throughout the specification, when one part is referred to as being "connected to" another part, one part and another part may be "directly connected to" each other, or may be "electrically connected to" each other with still another part interposed therebetween.

Throughout the specification, when one member is referred to as being disposed "on" another member, one member and another member may be in contact with each other, or a third member may be interposed between one member and another member.

Throughout the specification, "including" one component is to be understood to imply the inclusion of other components rather than the exclusion of other components, unless explicitly described to the contrary. As used throughout the specification, a term of degree "about", "substantially", or the like is used to indicate the number of a stated meaning or its approximation when its manufacturing or material tolerance inherent therein is given. Such a term is used to prevent unscrupulous infringers from unfairly using the present disclosure in which exact or absolute figures are stated to facilitate the understanding of this application. As used throughout the specification, a term of "step of (doing)" or "step of~" does not indicate a "step for~".

Hereinafter, the embodiments of the present disclosure are described in detail with reference to the accompanying drawings and the description provided below. However, the present disclosure is not limited to the embodiments described herein, and may also be embodied in another form. Same reference numerals denote same components throughout the specification.

Hereinafter, the description describes a battery module comprising a cooling plate filled with a phase change material according to an embodiment of the present disclosure.

FIG. 2 is an exploded view showing the battery module comprising the cooling plate filled with the phase change material according to an embodiment of the present disclosure.

Referring to FIG. 2, a battery module 1 comprising a cooling plate filled with a phase change material may include a battery cell 10, a cooling plate 20, a pad 30, a heat transfer interface material 40, a cooling channel 50, a board 60, a front plate 70, a rear plate 80, a side plate 90, and an upper cover 100.

First, the battery cell 10 is described.

The plurality of battery cells 10 may be provided, and the battery cell may be a conventional prismatic battery cell or a pouch-type battery cell.

Next, the cooling plate 20 is described.

As shown in FIG. 2, the cooling plate 20 may be installed between the adjacent battery cells 10 among the plurality of battery cells 10, and absorb heat occurring from the plurality of battery cells 10.

FIG. 3 is a cross-sectional view of the cooling plate.

Referring to FIG. 3, the cooling plate 20 may be filled with a phase change material.

Here, the phase change material filling the cooling plate 20 may be a paraffin-based material, and the phase change temperature of the phase change material may be 5 degrees or more and 55 degrees or less.

In detail, the cooling plate 20 may have at least one chamber 22 disposed therein, the phase change material may fill the chamber, and the phase change material may be made of aluminum.

The plurality of chambers 22 may be disposed in the cooling plate 20 to be further away from the heat transfer interface material 40 described below, and the phase change materials filled in the chambers 22 may respectively have different phase change temperatures.

For example, among the plurality of chambers disposed in the cooling plate 20, the phase change material filled in the chamber 22 disposed at a first distance from the heat transfer interface material 40 may have the phase change temperature of a first degree, the phase change material filled in the chamber 22 disposed at a second distance from the heat transfer interface material 40 may have the phase change temperature of a second degree, the first distance may be longer than the second distance, and the first degree may be lower than the second degree.

FIG. 4 is a table showing an example of the cooling plate filled with the phase change material having a different phase change temperature for each chamber.

In detail, referring to FIGS. 3 and 4, the chambers 22 of N1, N2, N3, N4, and N5 may be arranged in the cooling plate 20 in order of a closer distance from the heat transfer interface material 40. In this case, a temperature of the phase change material filled in each chamber 22 may be lower from the chamber 22 of N1 to the chamber 22 of N5.

As such, the chamber 22 accommodating the phase change material having a lower phase change temperature may be disposed adjacent to the battery cell 10 disposed away from the heat transfer interface material 40 to thus have a higher temperature, and the chamber 22 accommodating the phase change material having a higher phase change temperature may be disposed adjacent to the battery cell 10 disposed close to the heat transfer interface material 40 to thus have a lower temperature. Accordingly, temperature deviation of the battery cell 10 for each position may be minimized regardless of its distance from the heat transfer interface material 40.

In addition, the phase change material may effectively absorb heat even with a small amount. Therefore, the cooling plate 20 filled with the phase change material may be made lighter by including such a small amount of the phase change material.

Meanwhile, referring to FIG. 3, the number of the plurality of chambers 22 arranged in the cooling plate 20 may be 5 or less, and a shortest distance "b" between the chamber 22 and an outer circumferential surface of the cooling plate 20 may be half of a width "a" of the chamber.

In addition, the width "a" of the chamber 22 may be 2 mm or less, and a height of the chamber 22 may be 5 mm or more.

In addition, a predetermined portion of the cooling plate 20 may be inserted into the heat transfer interface material 40 described below.

FIG. 5 is a view showing the cooling plate whose predetermined portion is inserted into a heat transfer interface material.

In detail, referring to FIG. 5, the cooling plate 20 may be brought into contact with the heat transfer interface material 40 by inserting its predetermined portion into the heat transfer interface material 40, and a length h1 of the predetermined portion of the cooling plate 20 that is inserted into the heat transfer interface material 40 may be 5% or more of a longitudinal length h2 of the cooling plate 20 to be further away from the heat transfer interface material 40.

Next, the pad 30 is described.

Referring to FIG. 2, the pad 30 may be installed between the cooling plate 20 and the battery cell 10 adjacent to the cooling plate 20, and have elasticity to suppress swelling of the battery cell 10 and swelling of the cooling plate 20.

Next, the heat transfer interface material 40 is described.

Referring to FIG. 2, the heat transfer interface material (TIM) 40 may be coupled to one side of the plurality of battery cells 10 to be in contact with the plurality of cooling plates 20, and receive heat from the plurality of cooling plates 20 and transfer the same to a cooling channel 50 described below.

In addition, the heat transfer interface material 40 may have a thermal conductivity of 3 W/mk or more.

Next, the cooling channel 50 is described.

Referring to FIG. 2, the cooling channel 50 may be coupled to one side of the heat transfer interface material 40 to receive heat from the heat transfer interface material 40 and transfer heat to the outside.

This cooling channel 50 may be configured in the same way as the cooling block included in a conventional battery module.

Next, the board 60 is described.

Referring to FIG. 2, the board 60 may include a bus bar electrically connecting the plurality of battery cells 10 to each other and a printed wiring circuit board (PCB) for measuring the voltages and temperatures of the plurality of battery cells 10, and may be installed on top of the plurality of battery cells 10.

Next, the front plate 70, the rear plate 80, and the side plate 90 are described.

Referring to FIG. 2, the front plate 70 may be coupled to the front of the plurality of battery cells 10, the rear plate 80 may be coupled to the rear of the plurality of battery cells 10, and the side plate 90 may be coupled to the side of the plurality of battery cells 10.

The front plate 70, the rear plate 80, and the side plate 90 may each have a plate shape.

Next, the upper cover 100 is described.

Referring to FIG. 2, the upper cover 100 may be coupled to the top of the plurality of battery cells 10 to cover the board 60, and may have a plate shape.

The battery module 1 comprising the cooling plate filled with the phase change material according to an embodiment of the present disclosure configured as described above may effectively prevent an increase in the temperature of the battery cell 10, and may minimize the temperature deviation of the battery cell 10 for each position.

FIG. 6 is a table showing a temperature of a battery cell for each position based on a conventional cooling plate and a cooling plate included in the battery module comprising the cooling plate filled with the phase change material.

In detail, as shown in FIG. 6, compared to a battery module including the conventional cooling plate, the battery module 1 comprising the cooling plate 20 filled with the phase change material has not only a lower overall temperature of the battery cell 10, but also a smaller temperature deviation of the battery cell 10 for each position.

As such, the battery module comprising the cooling plate filled with the phase change material according to the present disclosure may use the cooling plate filled with the phase change material which may effectively absorb heat even with such a small amount to cool the battery cell, thereby effectively cooling the battery cell while being lightweight.

In addition, among the plurality of chambers disposed in the cooling plate, the phase change material filled in the chamber disposed away from the heat transfer interface material may have the lower phase change temperature than the phase change material filled in the chamber disposed close to the heat transfer interface material. It is thus possible to minimize the temperature deviation of the battery cell for each position, thereby preventing the lower performance of the battery cell.

According to one general aspect of the present disclosure described above, the battery module comprising the cooling plate filled with the phase change material according to the present disclosure may use the cooling plate filled with the phase change material which may effectively absorb heat even with such a small amount to cool the battery cell, thereby effectively cooling the battery cell while being lightweight.

In addition, among the plurality of chambers disposed in the cooling plate, the phase change material filled in the chamber disposed away from the heat transfer interface material may have the lower phase change temperature than the phase change material filled in the chamber disposed close to the heat transfer interface material. It is thus possible to minimize the temperature deviation of the battery cell for each position, thereby preventing the lower performance of the battery cell.

The above-described embodiments are illustratively provided, and it is apparent to those skilled in the art to which the present disclosure pertains that the present disclosure may be embodied in another specific form without any change in its technical idea or essential characteristics. Therefore, it is to be understood that the embodiments described hereinabove are illustrative rather than being restrictive in all respects. For example, the components each described as a single type may also be implemented in a distributed manner, and similarly, the components described as being distributed from each other may also be implemented in a combined manner.

It is to be understood that the scope of the present disclosure is defined by the claims disclosed below rather than the detailed description provided above, and includes all alternations and modifications derived from the claims and their equivalents.

What is claimed is:

1. A battery module comprising:

a plurality of battery cells;

a plurality of cooling plates each installed between adjacent battery cells among the plurality of battery cells to absorb heat from the plurality of battery cells;

a heat transfer interface material coupled to one side of the plurality of battery cells to be in contact with the plurality of cooling plates, and receiving heat from the cooling plates; and a cooling channel coupled to one side of the heat transfer interface material to receive heat from the heat transfer interface material and transfer heat to outside, wherein each cooling plate of the plurality of cooling plates includes plurality of chambers containing a phase change material, wherein the plurality of chambers are arranged such that a chamber located farther from the heat transfer interface material contains the phase change material having lower phase change temperatures than the phase change material contained in a chamber located closer to the heat transfer interface material.

2. The battery module of claim 1, wherein the plurality of cooling plates are made of aluminum.

3. The battery module of claim 2, wherein the number of the plurality of chambers is 5 or less.

4. The battery module of claim 3, wherein a shortest distance between at least one of the plurality of chambers and an outer circumferential surface of the cooling plate of the plurality of cooling plates is half of a width of the at least one of the plurality of chambers.

5. The battery module of claim 4, wherein the width of the at least one of the plurality of chambers is 2 mm or less.

6. The battery module of claim 5, wherein a height of the at least one of the plurality of chambers is 5 mm or more.

7. The battery module of claim 6, wherein the cooling plate of the plurality of cooling plates has a predetermined portion inserted into the heat transfer interface material, and a length of the predetermined portion is 5% or more of a longitudinal length of the cooling plate of the plurality of cooling plates to be further away from the heat transfer interface material.

8. The battery module of claim 7, wherein the phase change material filling each cooling plate of the plurality of cooling plates is a paraffin-based material.

9. The battery module of claim 8, wherein the phase change temperature of the phase change material filling each cooling plate of the plurality of cooling plates is 5 degrees or more and 55 degrees or less.

10. The battery module of claim 9, wherein a pad having elasticity is installed between each cooling plate of the plurality of cooling plates and each of the plurality of battery cells adjacent to each cooling plate.

11. The battery module of claim 10, in which each of the plurality of battery cells is a prismatic battery cell or a pouch-type battery cell, further comprising:

a board including a bus bar electrically connecting the plurality of battery cells to each other and a printed wiring circuit board for measuring voltages and temperatures of the plurality of battery cells, and installed on a top of the plurality of battery cells;

a front plate coupled to a front of the plurality of battery cells;

a rear plate coupled to a rear of the plurality of battery cells;

a side plate coupled to a side of the plurality of battery cells; and an upper cover coupled to the top of the plurality of battery cells to cover the board.

12. The battery module of claim 11, wherein the heat transfer interface material has a thermal conductivity of 3 W/mk or more.

* * * * *